US008005855B2

(12) United States Patent  
Kikin-Gil

(10) Patent No.: US 8,005,855 B2
(45) Date of Patent: Aug. 23, 2011

(54) INTERFACE WITH SCHEDULING INFORMATION DURING DEFINED PERIOD

(75) Inventor: Erez Kikin-Gil, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 444 days.

(21) Appl. No.: 11/966,498

(22) Filed: Dec. 28, 2007

(65) Prior Publication Data

US 2009/0171988 A1     Jul. 2, 2009

(51) Int. Cl.
G06F 7/00        (2006.01)
G06F 17/30       (2006.01)

(52) U.S. Cl. ........ 707/769; 707/784; 707/805; 715/963; 709/204

(58) Field of Classification Search .................. None
See application file for complete search history.

(56) References Cited

U.S. PATENT DOCUMENTS

| | | | |
|---|---|---|---|
| 6,094,681 A | 7/2000 | Shaffer et al. | |
| 6,823,357 B1 | 11/2004 | Du et al. | |
| 6,965,900 B2 | 11/2005 | Srinivasa et al. | |
| 7,174,517 B2 | 2/2007 | Barnett et al. | |
| 7,370,282 B2 * | 5/2008 | Cary | 715/772 |
| 2001/0049617 A1 | 12/2001 | Berenson et al. | |
| 2003/0154116 A1 | 8/2003 | Lofton | |
| 2004/0243677 A1 | 12/2004 | Curbow et al. | |
| 2005/0039142 A1 * | 2/2005 | Jalon et al. | 715/823 |
| 2005/0091120 A1 | 4/2005 | Auletta | |
| 2005/0132005 A1 * | 6/2005 | Horvitz et al. | 709/204 |
| 2006/0041460 A1 * | 2/2006 | Aaron | 705/8 |
| 2007/0162322 A1 | 7/2007 | Shahine et al. | |
| 2007/0233736 A1 | 10/2007 | Xiong et al. | |

OTHER PUBLICATIONS

Unknown, "Birthday Calendar Reminder 3.2.1.," available at http://www.fileflash.com/program/23275/, printed on Oct. 25, 2007, 2 pages.
Unknown, "Calendar of Events," available at http://calendar-of-events.qarchive.org/, printed on Oct. 25, 2007, 2 pages.
Unknown, "Desktop Calendar and Planner Software," available at http://planner.qarchive.org/, printed on Oct. 25, 2007, 2 pages.

* cited by examiner

Primary Examiner — Kuen Lu
Assistant Examiner — Loan T Nguyen
(74) Attorney, Agent, or Firm — Senniger Powers LLP

(57) ABSTRACT

Providing a user with scheduling information for a defined period of time. Calendar data which is indicative of the user's availability during the defined period of time is obtained based on an electronic calendar associated with the user. Event data which is indicative of event scheduled during the defined period of time is retrieved. The obtained calendar data and the retrieved event data are graphically displayed as a function of the defined period of time so that one of the event data and the calendar data is overlaid on the other of the event data and the calendar data.

11 Claims, 8 Drawing Sheets

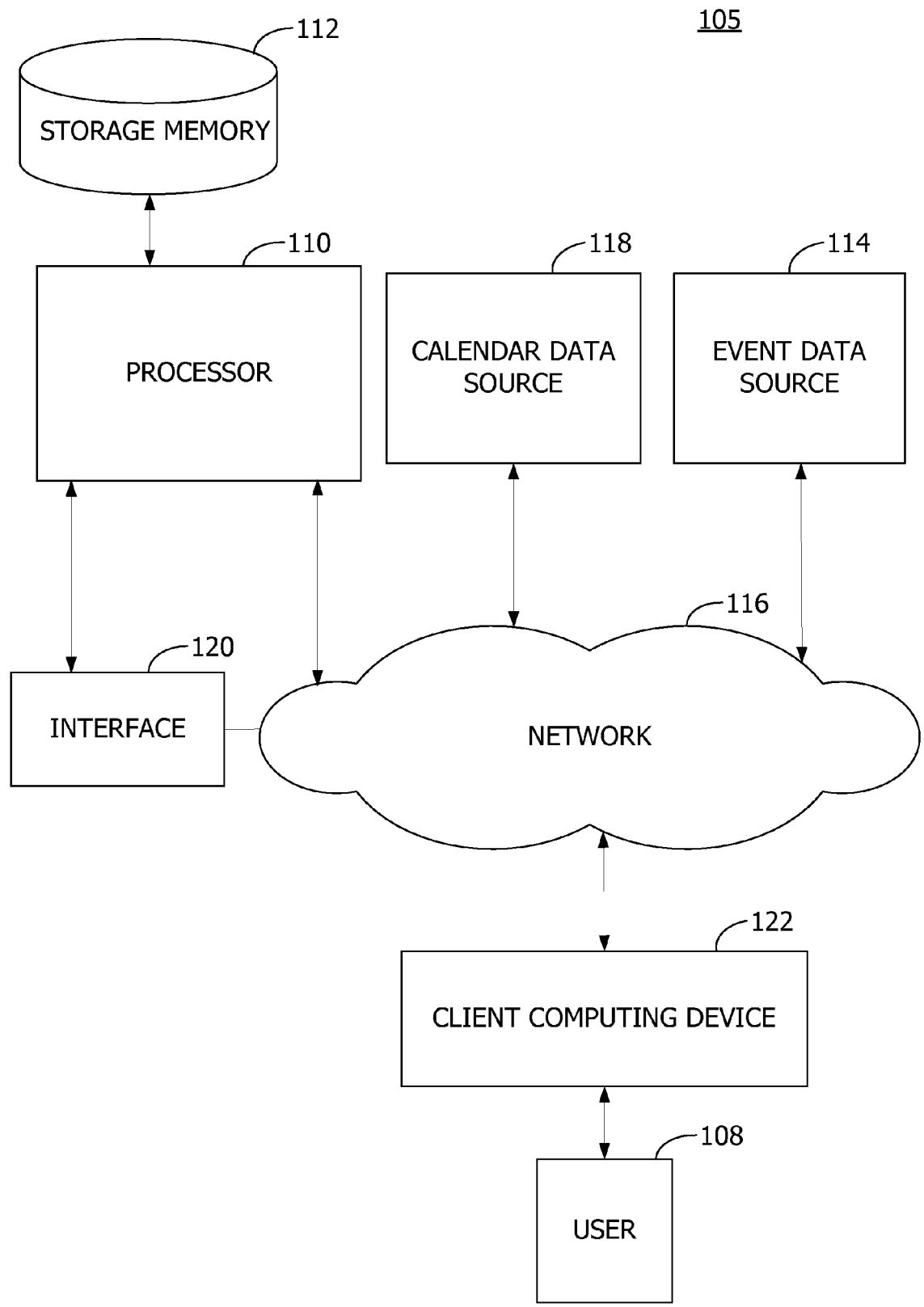

INTERFACE WITH SCHEDULING INFORMATION DURING DEFINED PERIOD

BACKGROUND

Digital devices are increasingly used by society to perform services and to provide and manage information. Digital devices exchange electronic information via networks such as the internet and intranet allowing users to discover, promote, share and create events. Currently users can subscribe to public events, such as concerts, movie showings, theatrical performances, book readings, and other events published on the web.

Current web applications which publish such events (hereinafter "event data sources") generally display the events in text format or on a calendar grid. The events are not displayed in a user-friendly manner which allows the user to easily determine events to attend. In addition, since current events change with time, the user must ensure the he or she is receiving the most updated scheduling of the events. Several different formatting and delivery techniques are available for providing updated content. For example, updated event data may be delivered via a network, for example in an email or an instant messaging communication, or via a tangible computer readable storage medium. As a result of the multitude of options for formatting and delivering updated event data, users are burdened with a plurality of individual and inconsistent experiences for receiving and displaying events. Accordingly, users often fail to learn about the events until the events have passed, attendance for the event is no longer available, or the ticket cost for the events is inflated.

In addition, current web applications do not incorporate the user's availability in displaying the events. As such, the user is unable to determine whether the user is available to attend an event. Likewise, when an event displayed by a current web application is offered at multiple times, current web applications do not allow the user identify the time that the user would prefer to attend the event based on the user's availability.

SUMMARY

Embodiments of the present invention improve a user experiences in scheduling events by providing a convenient way for the user to track upcoming events with reference to the user's availability. Aspects of the invention track upcoming events based on a variety of criteria provided by the user. For example, the invention may track different types of events and the events may be published by different sources. Additionally, aspects of the invention provide a graphical illustration of the user's availability over a defined period of time and a graphical illustration of the tracked events scheduled to occur during the defined period of time. Accordingly, the user may easily compare the user's availability with the tracked events. In one embodiment, the present invention allows a user to schedule one or more of the tracked events. For example, the user may purchase tickets a tracked event and add the tracked event to the user's electronic calendar. Thus, the present invention allows the user to efficiently schedule upcoming events.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

FIGS. 1A, 1B, and 1C are block diagrams of exemplary environments in which one embodiment of the present invention can be used to provide scheduling information to a user.

Corresponding reference characters indicate corresponding parts throughout the drawings.

DETAILED DESCRIPTION

Aspects of the present invention provide a user interface having scheduling information during a defined period of time. In one embodiment, the user interface includes a graphical illustration of the user's availability over the defined period of time and a graphical illustration of selected events scheduled during the defined period of time. The user interface incorporates the graphical illustration of the user's availability and the graphical illustration of the selected events on a single axis representing the defined period of time. Embodiments of the invention allow a user to easily compare a user's availability with scheduled events.

Figure 1A:
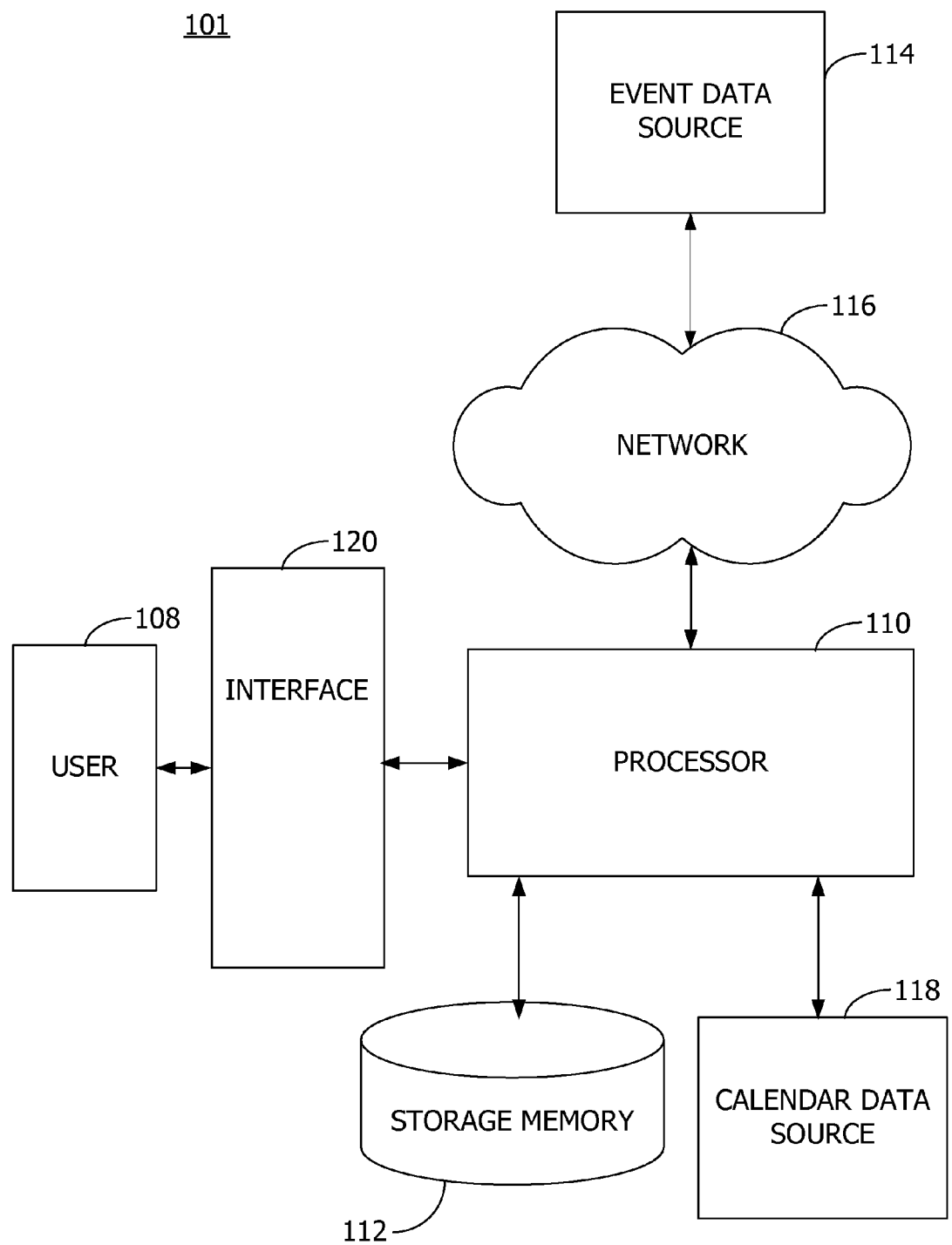
Figure 1B:
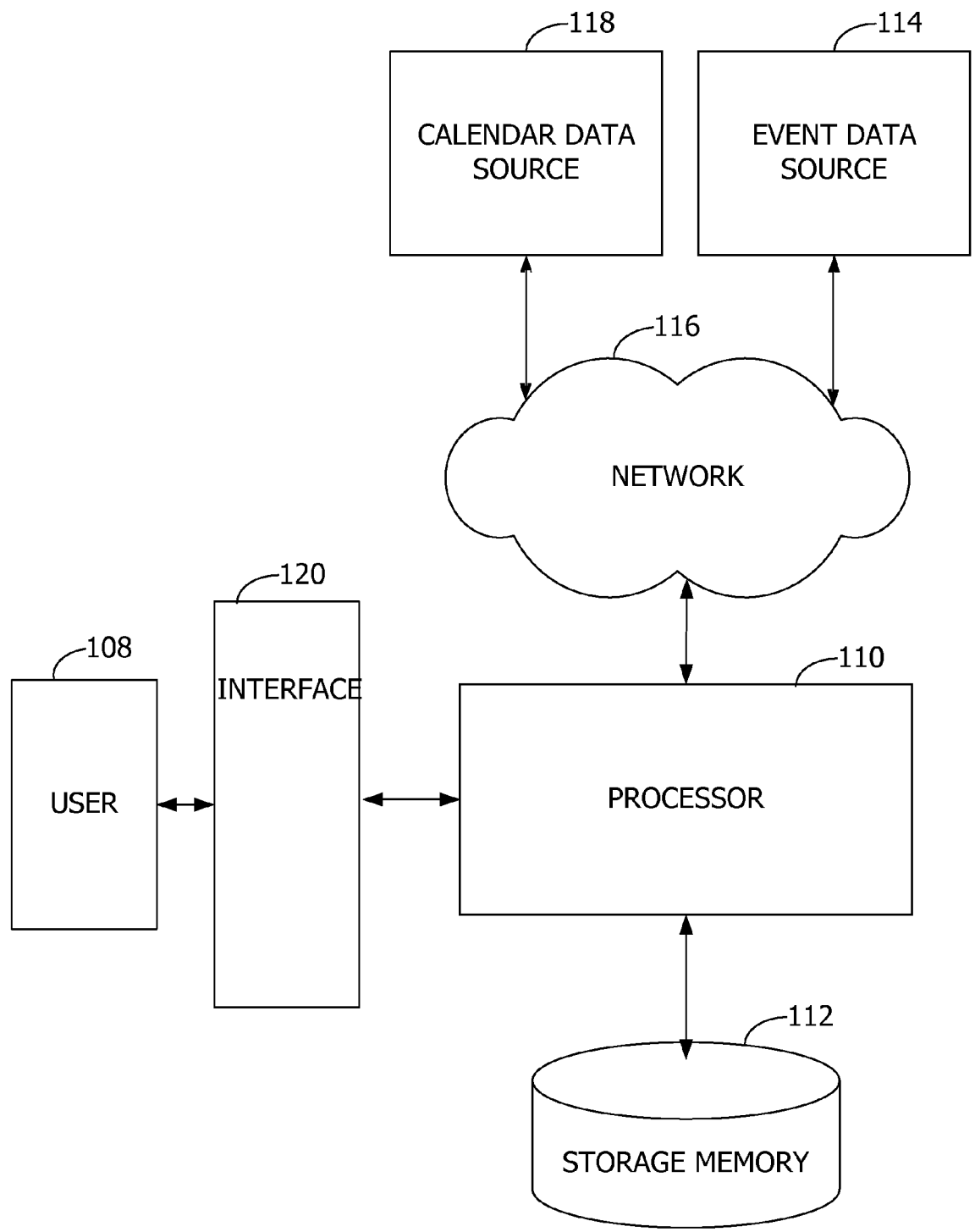

FIGS. 1A, 1B, and 1C are block diagrams illustrating exemplary environments 101, 103, 105 in which the present invention may be utilized. In general, the exemplary environments 101, 103, 105 include a processor 110 and a storage memory 112 (i.e., memory area) associated with the processor 110 for providing a user 108 with scheduling information during a defined period of time. The processor 110 executes a plurality of computer-executable instructions for performing a plurality of operations. The memory area is accessible by the processor 110 for storing information and data for the processor 110 in connection with the operations performed by the processor 110. In one example, the processor 110 may execute computer-executable instructions embodied in one or more software applications, components within an application or software, executable library files, executable applets, or the like. In one example, the storage memory 112 stores the computer-executable instructions and/or other data used/accessed by the processor 110.

In one embodiment, the storage memory 112 may be volatile or nonvolatile media, removable and non-removable media, and/or any available medium that may be accessed by a computer or a collection of computers (not shown). By way of example and not limitation, computer readable media include computer storage media. The computer storage media in any method or technology for storage of information such as computer readable instructions, data structures, program modules or other data. For example, computer storage media include RAM, ROM, EEPROM, flash memory or other memory technology, CD-ROM, digital versatile disks (DVD)

or other optical disk storage, magnetic cassettes, magnetic tape, magnetic disk storage or other magnetic storage devices, or any other medium that may be used to store the desired information and that may be accessed by the computer.

In one embodiment, the processor 110 and the storage memory 112 may be incorporated into one or more computing devices. As known to those skilled in the art, computing devices include a combination of the following: a processor 110, one or more computer-readable media, an internal bus system coupling to various components within the computing devices 108, Input/Output devices, a networking device, and other devices. Exemplary computing devices include one or a combination of the following: a personal computer (PC), a workstation, a cellular phone, a portable digital device, a personal digital assistance (PDA), a pocket PC, a digital media player, and any other digital devices.

The exemplary environments 101, 103, 105 include a calendar data source 118 having calendar data.

In one embodiment, the calendar data source 118 is an application having user-specific data (e.g., private data). The calendar data source 118 may include an electronic calendar associated with the user 108 and the calendar data is indicative of the user's availability during the defined period of time according to the electronic calendar. The calendar data may also indicate the amount of time in terms a time unit (e.g., seconds, minutes, hours, days, years) for which a user 108 is available or unavailable as a function of the defined time period. For example, the calendar data may indicate the number of hours per day which the user 108 is unavailable according the user's electronic calendar for each day during a three month time period.

In another embodiment, the calendar data additionally or alternatively indicates the number of events which the user 108 is scheduled to attend as a function of the defined time period. For example, the calendar data may indicate the number of meetings per day which the user 108 has scheduled on the user's electronic calendar for each day during a three month time period. The calendar data may additionally or alternatively include one or more of the following calendar parameters with respect to one or more of the events on the user's calendar: a description of the event, a status associated with the event (e.g., busy, in the office, out of the office, tentative), a starting time and/or an ending time for the event, a duration time for the event, a frequency with which the event occurs, other attendees of the event, the location of the event, and images or other graphics associated with the event.

The exemplary environments 101, 103, 105 include an event data source 114 having event data. In one embodiment, the event data source 114 is an application having non-user specific data (e.g., public data). The event data source 114 may include a web site or web portal publishing events and the event data is indicative of published events scheduled to occur during the defined period of time. The event data may also indicate the amount of time (i.e., duration) in terms a time unit (e.g., seconds, minutes, hours, days, years) during which selected events are scheduled to occur as a function of the defined time period. For example, the event data may indicate the number of hours per day for which selected events are scheduled to occur according to an event planning website for each day during a three month time period. In another embodiment, the event data additionally or alternatively indicates the number of selected events scheduled to occur as a function of the defined time period. For example, the event data may indicate the number of concerts scheduled per day according to an event planning website for each day during a three month time period. Exemplary events indicated by the event data include one or more of the following: movie showings, concerts, theatrical performances, book readings, sporting events, and other public or private gatherings. In one embodiment the event data additionally or alternatively includes one or more of the following event parameters with respect to one or more of the selected events: a description of the event, a starting time and/or an ending time for the event, a duration time for the event, a frequency with which the event occurs, other attendees of the event, the location of the event, images, graphics and/or audio files associated with the event, a link to the event data source 114, a link to another web site associated with the event, information for attending the event (e.g., ticket booking information), information for contacting an entity associated with the event, and fees associated with event attendance.

Figure 2:
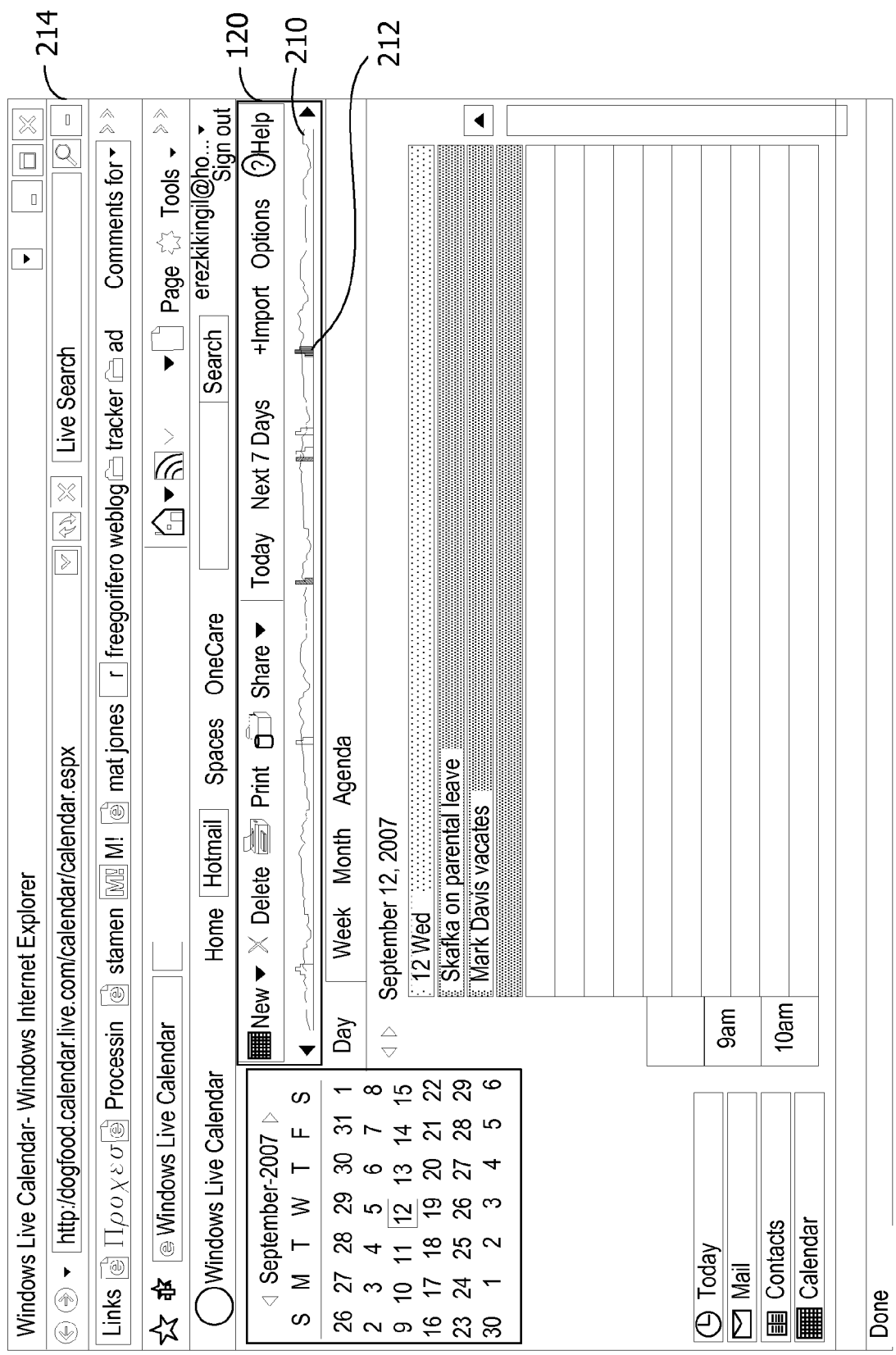
FIG. 2 illustrates a screen shot of an interface displayed in connection with an electronic calendar according to one embodiment of the invention.

The exemplary environment includes an interface 120 for interacting with the user 108. FIG. 2 is a drawing of a screenshot illustrating an exemplary interface 120 for providing the user 108 with a graphical illustration of the scheduling data according to an embodiment of the invention. In one embodiment, the processor 110 obtains calendar data based on an electronic calendar associated with the user 108 and retrieves event data from the event data source 114. The processor 110 may retrieve event data from the event data source 114 based on event criteria (e.g., type of event, location of event) provided by the user 108. The processor 110 graphically displays the obtained calendar data as a function of time for the defined period of time (indicated by reference number 210) via the interface 120. The processor 110 graphically displays the retrieved event data as a function of time for the defined period of time (indicated by reference number 212) via the interface 120. The interface 120 may be provided to the user 108 in conjunction with features of another application. For example, the interface 120 is provided to the user 108 in conjunction with the electronic calendar 214. Although the exemplary environment illustrates a single calendar data source 118, it is to be understood that the processor 110 may obtain calendar data from a plurality of calendar data sources 118. Likewise, although the exemplary environment illustrates a single event data source 114, it is to be understood that the processor 110 may retrieve event data from a plurality of event data sources 114.

FIG. 1A illustrates one exemplary environment 101 in which the present invention may be utilized to provide scheduling information to the user 108. In the illustrated exemplary environment, the processor 110 and the storage memory 112 are incorporated into one or more client computing devices (not shown) and the calendar data source 118 is a client application stored by the storage memory 112 or other memory area associated with the one or more client computing devices. The event data source 114 is a web site, web portal, or other web-based application accessible by the one or more client computing devices via a network 116 (e.g., intranet, internet). The interface 120 is a graphical user 108 interface 120 (e.g., object-oriented user interface 120, application oriented user interface 120) generated by the one or more client computing devices for interacting with the user 108.

FIG. 1B illustrates another exemplary environment 103 in which the present invention may be utilized to provide scheduling information to the user 108. In the illustrated exemplary environment, the processor 110 and the storage memory 112 are incorporated into one or more client computing devices. The calendar data source 118 and the event data source 114 are web sites, web portals, or other web-based applications accessible by the one or more client computing devices via a network 116 (e.g., intranet, internet). For example, the calendar data source 118 may be a web-based time/information management system in which the user 108 has an account and a memory area accessible by the management system for storing the user's calendar data in connection with the user's account. The interface 120 is a graphical user 108 interface 120 (e.g., object-oriented user interface, application oriented user interface) generated by the one or more client computing devices for interacting with the user 108.

FIG. 1C illustrates yet another exemplary environment 105 in which the present invention may be utilized to provide scheduling information to the user 108. In the illustrated exemplary environment, the processor 110 and the storage memory 112 are incorporated into a computing system having a server computing device which provides services to one or more other computing devices, such as client computing devices 122. The calendar data source 118 and the event data source 114 are web sites, web portals, or other web-based applications accessible by the one or more client computing devices 122 via a network 116 (e.g., intranet, internet). In one embodiment, the calendar data source 118 and/or the event data source 114 are web applications provided by the server computing device. In another embodiment, the calendar data source 118 and/or the event data source 114 additionally or alternatively are web applications provided by another server computing device. For example, the calendar data source 118 and/or the event data source 114 may be web sites affiliated with the server computing device. In the illustrated exemplary environment, the interface 120 is a web-based user interface which includes a web site or web portal hosted by the server computing device. The interface 120 is accessible via an internet or intranet 116 by a user 108 of a client computing device 122 using web browser software.

Figure 3:
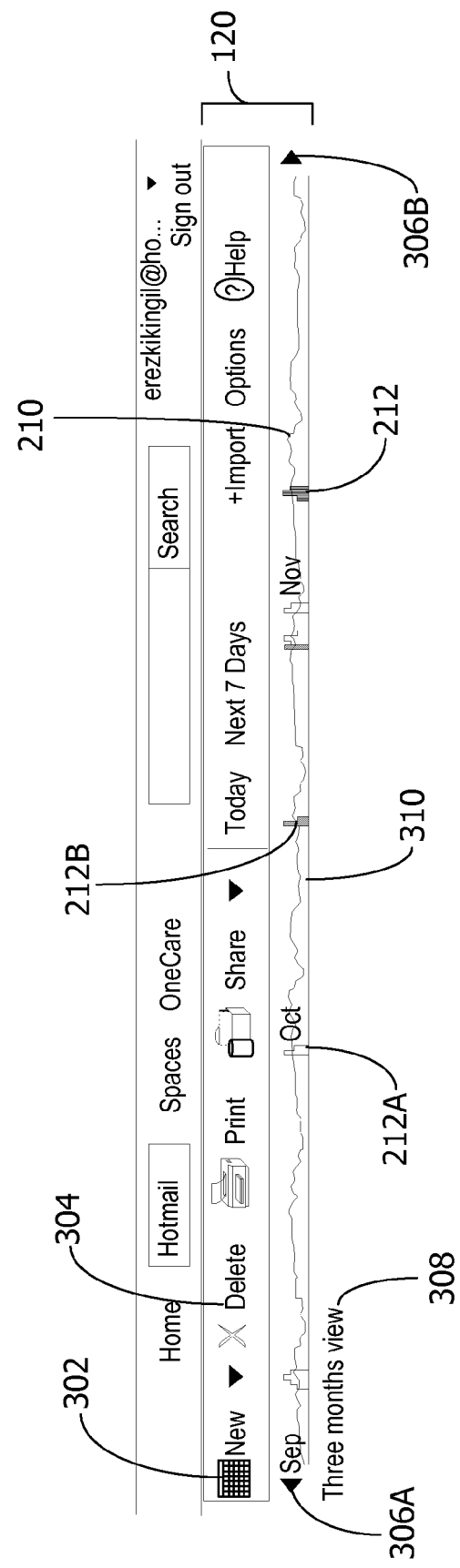
FIG. 3 illustrates a screen shot of a user interface according to one embodiment of the invention.
Figure 4:
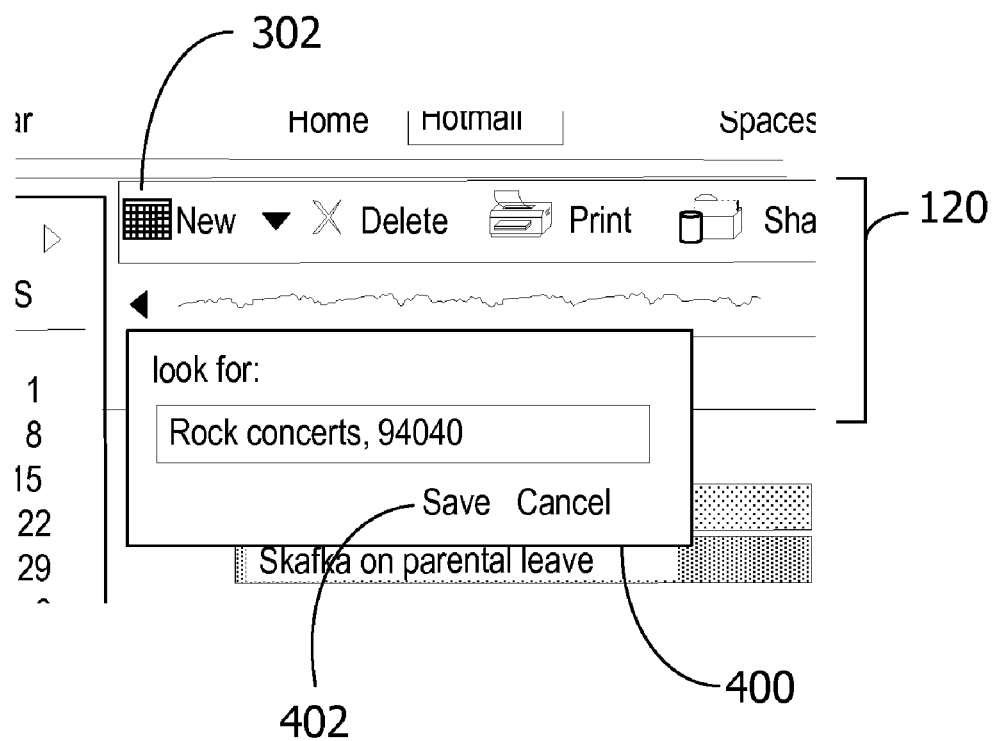
FIG. 4 illustrates a screen shot of a query window included in a user interface according to one embodiment of the invention.

Referring to FIG. 3, in one embodiment the interface 120 allows the user 108 to provide event criteria for defining the events displayed via the interface 120. The exemplary interface 120 illustrated by FIG. 3 includes a "New" button 302 for allowing the user 108 to provide event criteria for defining the events displayed via the interface 120. Referring to FIG. 4, in one embodiment the interface 120 includes a query window 400 for interfacing with the user 108 to obtain the event criteria. For example, the query window 400 is presented to the user 108 in response to the user 108 selecting the "New" button 302. The user 108 enters event criteria into the query window 400 and the processor 110 receives the entered event criteria. The processor 110 retrieves (i.e., subscribes to) event data from an event data source 114 based on the received event criteria. In the illustrated example, the user 108 entered the event criteria "Rock concerts, 94040" and selected "save" (402). According to example, the processor 110 saves the entered event criteria and retrieves event data for rock concerts to be performed in the 94040 zip code in response to the user's request. In one embodiment, the processor 110 queries the event data source 114 at a defined time interval (i.e., frequency) for event data based on the received event criteria. In another example, the processor 110 may generate a query using extensible markup language (XML). The processor 110 may use an aggregator, such as a web feed reader, to subscribe to a web feed (e.g., really simple syndication (RSS) feed) syndicated by the event data source 114. The aggregator is configured to check the subscribed web feed at a particular frequency for new content. The aggregator retrieves event data corresponding to the event criteria when such event data is included in the new content as indicated by the web feed. The processor 110 may retrieve event data based on multiple sets of event criteria provided by the user 108. In the embodiment illustrated by FIGS. 3 and 4 the user 108 may provide multiple sets of event criteria using, for each set of event criteria, the "New" button 302 to initiate the query window for entering a set of event criteria and the "Save" button 402 to retrieve event data based on the entered set of criteria.

Referring still to FIG. 3, in one embodiment, the present invention allows the user 108 via the interface 120 to manipulate event criteria stored by the processor 110 (i.e., in the storage memory 112). A "Delete" button 304 selectable by the user 108 deletes event criteria previously stored by the processor 110. The present invention additionally or alternatively edits (e.g., change) event criteria previously stored by the processor 110 in response to a user 108 request via the interface 120. The present invention additionally or alternatively displays event criteria previously stored by the processor 110 and allows the user 108 to view, sort, filter, print and/or otherwise manage the event criteria via the interface 120. The defined period of time is defined by the user 108. Scroll arrows 306a, 306b allow the user 108 to change the starting and ending time points for the defined period of time and includes a period length parameter labeled "Three months view" 308 which may be specified by the user 108.

In one embodiment, the present invention graphically displays the obtained calendar data 210 and the retrieved event data 212 along the same axis 310 which represents the defined period of time. The present invention may render the obtained calendar data 210 as a first layer and the retrieved event data 212 as a second layer. In embodiment, the first layer is rendered on top of the second layer and both layers are visible via the interface 120. In another embodiment, the second layer is rendered on top of the first layer and both layers are visible via the interface 120. As illustrated by FIG. 3, in one embodiment the present invention overlays (i.e., superimposes) the retrieved event data 212 onto the obtained calendar data 210. Alternatively, the present invention may overlay the obtained calendar data 210 on to the retrieved event data 212. Thus, the event data is configured to be simultaneously with the calendar data so that one of the event data and the calendar data is overlaid on the other of the event data and the calendar data In one embodiment, the present invention displays a calendar graph illustrating an amount of time a user 108 is available or unavailable as a function of the predefined period. The calendar graph includes one axis (e.g., a horizontal axis) representing the defined period of time (e.g., 3 months) as a function of a first unit of time (e.g., days). The calendar graph includes a second axis (e.g., a vertical axis) representing the first unit of time (e.g., days) as a function a second unit of time (e.g., hours). The first unit of time is greater than the second unit of time. In the illustrated embodiment, the calendar graph is a line graph 210 representing the number of hours in a day which the user 108 is unavailable during the months of September, October, and November. In another embodiment, the present invention displays a calendar graph illustrating a number of events or items a user 108 is scheduled to attend (i.e., number of events causing the user 108 to unavailable for attending additional events) as a function of the predefined period. The calendar graph includes one axis (e.g., a horizontal axis) representing the defined period of time (e.g., 3 months) as a function of a first unit of time (e.g., days). The calendar graph includes a second axis (e.g., a vertical axis) representing the number of events. In yet another embodiment, the present invention displays a calendar graph having a plurality of axes with each axis representing a calendar parameter included in the calendar data.

In one embodiment, the present invention displays an event graph illustrating a number of events indicated by the retrieved event data as a function of the predefined time period. The event graph includes one axis (e.g., a horizontal axis) representing the defined period of time (e.g., 3 months) as a function of a first unit of time (e.g., days). The event graph includes a second axis (e.g., a vertical axis) representing a number of events. In the illustrated embodiment, a bar graph 212 represents the number of events scheduled to occur per day during the months of September, October, and November. The present invention may display an event graph illustrating a duration time scheduled for events indicated by the retrieved event data as a function of the predefined time period. The event graph includes one axis (e.g., a horizontal axis) representing the defined period of time (e.g., 3 months) as a function of a first unit of time (e.g., days). The event graph includes a second axis (e.g., a vertical axis) representing the first unit of time (e.g., days) as a function a second unit of time (e.g., hours). In yet another embodiment, the present invention displays an event graph having a plurality of axes with each axis representing an event parameter included in the event data. The plurality of axes for the calendar graph may be the same (i.e., shared axes, common axes) as the plurality of axes for the event graph.

In one embodiment, the present invention determines categories for the calendar data and/or the event data and graphically displays the calendar data and/or event data according to the determined categories. The present invention may define event data categories for categorizing the events indicated by the event data. The categories may be a function of the event parameters included in the event data. In another embodiment, the categories additionally or alternatively correspond to the event criteria. For example, one category may be defined to correspond to each set of event criteria wherein multiple sets of event criteria are provided. In yet another embodiment, the event data categories are additionally or alternatively defined by the user 108. The present invention may also define calendar data categories for categorizing the user's availability as indicated by the calendar data. For example, the categories may be a function of the calendar parameters included in the calendar data. For example, one category may be defined to correspond to each status (e.g., out of office, busy, tentative) associated with the obtained events/items on the user's calendar. In yet another embodiment, the calendar data categories are additionally or alternatively defined by the user 108.

In one embodiment, the present invention associates a visual characteristic with each of the defined categories (i.e., event data categories and/or calendar data categories). For example, the visual characteristic may be a color, a combination of colors, an animation, an image, a pattern of images and colors, or the like. The visual characteristic may also be associated annotation for color-blind or vision impaired users such that the associated annotation of the visual characteristic may be displayed as text or rendered audibly. The user 108 may specify a visual characteristic for associating with a defined category.

In one embodiment, the present invention determines for each of the events (i.e., events scheduled on user's calendar indicated by the obtained calendar data and/or events indicated by the retrieved event data) a category defined to include the event. In one embodiment, the present invention graphically displays the calendar data and/or event data according the visual characteristics associated therewith. In particular, each event is displayed by the visual characteristic associated with the determined category for said each event. In the example illustrated by FIG. 3, the event data is categorized according to event criteria sets. In the example, the events are displayed using a plurality of patterns. Each pattern indicates a particular category which is associated with the event indicated by the bar. Specifically, bars having transparent pattern 212A represent rock concerts occurring in the 94040 zip code and the bars having a diagonal line pattern 212B represent book readings related to a particular author. Accordingly, embodiments of the invention allow a user to easily differentiate among events. Advantageously, the user is able to prioritize events based on the visual characteristics with which the events are displayed.

Figure 5:
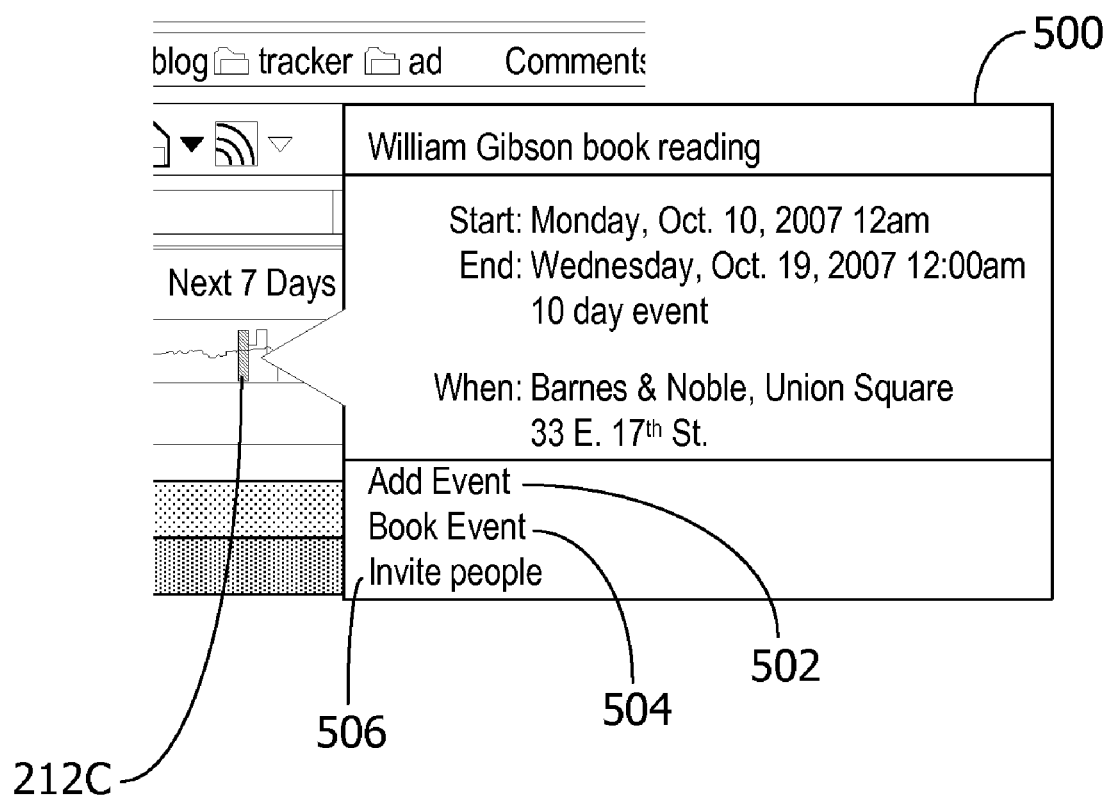
FIG. 5 illustrates a screen shot of a preview window included in a user interface according to one embodiment of the invention.

Referring to FIG. 5, in one embodiment, the present invention allows the user 108 to obtain additional information about user's availability and/or events which are graphically represented via the interface 120. The additional information may include any information retrieved in the calendar data and/or event data corresponding to the graphically represented scheduling information. The present invention may display additional details (e.g., via a preview/rollover window 500 included in the interface 120) about the William Gibson book reading event in response to the user 108 scrolling over the event bar 212C representing the William Gibson book reading. The present invention may also provide the user 108 with scheduling options associated with the graphically represented events. The present invention may also provide the user 108 via the interface 120 with one or more of the following scheduling options: add an event to the user's electronic calendar 502, contact the event provider for booking the event 504, and sending online communication having information about the event 506.

In one embodiment, the present invention adds a graphically represented event to the user's electronic calendar to receiving a scheduling option selected by the user 108 via the interface 120. The present invention may provide the user 108 contact information (e.g., a hyperlink, phone number, address) for booking the event in response to receiving a scheduling option selected by the user 108 via the interface 120. In another embodiment, the present invention generates a web-based document for booking the event with an online event provider in response to receiving a scheduling option selected by the user 108 via the interface 120. The present invention may also generate an online communication (e.g., email, online message) having information about a particular event for sending to recipients in response to receiving a scheduling option selected by the user 108 via the interface 120.

In one embodiment, the user 108 can request a reminder for a particular event. For example, the present invention reminds the user 108 on a particular date of the particular event via the interface 120, electronic calendar, and/or online communication in response to receiving a reminder request from the user 108.

Figure 6:
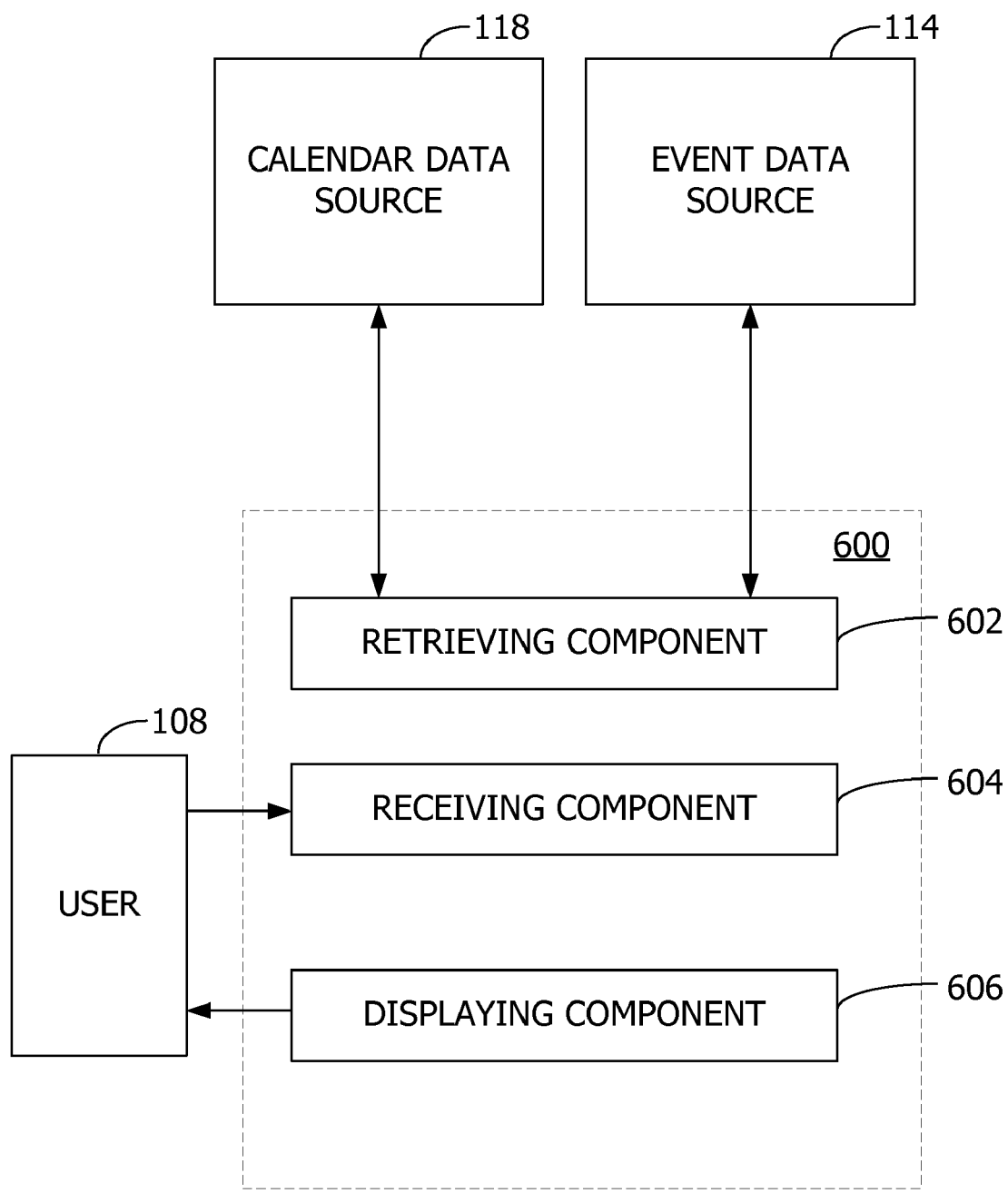
FIG. 6 is a block diagram illustrating a system for providing a user with scheduling information according to one embodiment of the invention.

FIG. 6 illustrates a system 600 for providing scheduling information to a user 108 according to an embodiment of the invention. The system 600 includes a receiving component 604 for receiving a request from the user 108 via the interface 120. In one embodiment, the request includes event criteria. In one example, the request may additionally include information, as discussed above, for categorizing the event data and/or calendar data, scheduling options, and/or receiving additional information about event data and/or calendar data. The system 600 includes a retrieving component 602 for retrieving calendar data based on an electronic calendar associated with the user 108 and for retrieving event data based on the event criteria received from the user 108. The retrieving component 602 may include an aggregator, such as a feed reader, for retrieving the event data and/or the calendar data. The system 600 includes a displaying component 606 for creating a graphical display of the retrieved calendar data as a function of time for the defined period of time and for creating a graphical display of the retrieved event data as a function of time for the defined period of time. The display component 606 displays to the user 108 the created event data graphical display the created calendar data display via the interface 120. The display component 606 may also display the event data in one layer and the calendar in another layer as discussed above.

In one embodiment, the storage memory 112 or other computer readable medium stores a data structure for providing the user 108 with scheduling information during the defined period of time in accordance with the features discussed above. The data structure includes a first data field for storing calendar data. The data structure includes a second data field for storing event criteria defined by the user 108. The data structure includes a third data field for storing event data retrieved as a function of the stored event criteria. The calendar data in the first data field and the event data in the third data field are each configured to be graphically displayed to the user 108 as a function of time for the defined period of time as discussed above. For example, the event data in the third data field may be configured to be overlaid on the calendar data in the first data field.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method of providing a user with scheduling information during a defined period of time, said method comprising:
    obtaining calendar data based on an electronic calendar associated with the user, said calendar data indicative of the user's availability during the defined period of time;
    defining event data categories for categorizing the events indicated by the event data, wherein said defining includes defining, by the user, event categories for categorizing the events indicated by the event data;
    displaying the obtained calendar data as a function of time in a single two dimensional graph, said single two dimensional graph having a first axis and a second axis, said first axis representing the defined period of time in terms of a time unit that is smaller than the defined period of time, said second axis representing one of the following total quantities determined from the obtained calendar data: a total quantity of second time units that the user is available for each first time unit, a total quantity of second time units that the user is unavailable for each first time unit, and a total number of calendar items scheduled for each first unit of time;
    retrieving event data from an event data source based on event criteria provided by the user, said event data source being separate from the calendar data and remote from the calendar data, said event data indicative of events scheduled during the defined period of time; determining, for each event in the retrieved event data, the event data category defined to include said each event; and
    displaying the retrieved event data as a function of time along the first axis of the single two dimensional graph in which the obtained calendar data is graphically displayed.

2. The method of claim 1 wherein said retrieved event data is overlaid on the graphically displayed calendar data.

3. The method of claim 1 wherein said retrieved calendar data is overlaid on the graphically displayed event data.

4. The method of claim 1 wherein said defined period of time is a user-defined period of time.

5. The method of claim 1 further comprising:
    associating a visual characteristic with each of the defined event data categories;
    and said graphically displaying the retrieved event data including graphically displaying each event included in the event data with the visual characteristic associated with the determined event category for said each event.

6. The method of claim 5 wherein said associating includes associating a visual characterization with each of the defined event data categories, said visual characterization being selected by the user.

7. A system of providing a user with scheduling information during a defined period of time, said system comprising:
    a computer configured to execute computer-executable instructions, said computer-executable instructions comprising:
    receiving an event request from a user, said request including event criteria; subscribing to event data from an event data source based on the received request; retrieving calendar data based on an electronic calendar associated with the user;
    retrieving event data from the event data source based on said subscribing, said event data source being separate from the calendar data and remote from the calendar data, said calendar data indicative of the user's availability during the defined period of time, said event data indicative of events scheduled during the defined period of time;
    determining a category for each event of the retrieved events according to one or more user-defined event data categories;
    displaying the retrieved calendar data as a function of time in a two dimensional graph having a first axis and a second axis, said first axis representing the defined period of time in terms of a time unit that is smaller than the defined period of time, said second axis representing one of the following total quantities determined from the retrieved calendar data: a total quantity of second time units that the user is available for each first time unit, a total quantity of second time units that the user is unavailable for each first time unit, and a total number of calendar items scheduled for each first unit of time; and displaying the retrieved event data as a function of time along the first axis of the same two dimensional graph in which the obtained calendar data is graphically displayed said displaying including displaying each event of the retrieved event data with a visual characteristic associated with the determined category of each said event, said graphically displayed data including at least two events have two different visual characteristics on the same axis.

8. The system of claim 7 wherein said computer-executable instructions further comprise instructions for retrieving calendar data based on an electronic calendar associated with the user and for retrieving at a particular time frequency event data based on the event criteria received from the user, said calendar data indicative of the user's availability during the defined period of time, said event data indicative of events scheduled during the defined period of time.

9. The system of claim 7 wherein said computer-executable instructions further comprise instructions for receiving an event request from a user, said request including event criteria and a selected scheduling option, said selected scheduling option requesting one or more of the following: adding an event to the electronic calendar associated with the user, booking attendance at the event, and generating a communication having event data for the event.

10. The system of claim 7 wherein said computer-executable instructions further comprise instructions for displaying a calendar detail for a particular calendar in response to a user selecting the particular calendar from the graphical display of the retrieved calendar data, wherein said calendar detail is included in the retrieved calendar data.

11. The system of claim 7 wherein said computer-executable instructions further comprise instructions for displaying an event detail for a particular event in response to a user selecting the particular event from the graphical display of the retrieved event data, wherein said event detail is included in the retrieved event data.

* * * * *